United States Patent
Lacroix et al.

(10) Patent No.: US 6,962,956 B2
(45) Date of Patent: Nov. 8, 2005

(54) ANTISTATIC STRENIQUE POLYMER COMPOSITIONS

(75) Inventors: Christophe Lacroix, Harquency (FR); Martin Baumert, Serquigny (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 10/502,978

(22) PCT Filed: Jan. 31, 2002

(86) PCT No.: PCT/FR02/00384

§ 371 (c)(1), (2), (4) Date: Jul. 30, 2004

(87) PCT Pub. No.: WO03/068861

PCT Pub. Date: Aug. 21, 2003

(65) Prior Publication Data

US 2005/0014899 A1 Jan. 20, 2005

(51) Int. Cl.⁷ ............................. C08L 71/02; C08L 77/00
(52) U.S. Cl. ............................. 525/63; 525/89; 525/90; 525/92 A
(58) Field of Search ................................. 525/63, 92 A, 525/89, 90

(56) References Cited

U.S. PATENT DOCUMENTS

| | | | |
|---|---|---|---|
| 4,029,720 A | * | 6/1977 | Seiler et al. .................. 525/89 |
| 4,115,475 A | | 9/1978 | Foy et al. |
| 4,195,015 A | | 3/1980 | Deleens et al. |
| 4,230,838 A | | 10/1980 | Foy et al. |
| 4,252,920 A | | 2/1981 | Deleens et al. |
| 4,331,786 A | | 5/1982 | Foy et al. |
| 4,332,920 A | | 6/1982 | Foy et al. |
| 4,483,975 A | | 11/1984 | de Jong et al. |
| 4,864,014 A | | 9/1989 | Cuzin et al. |
| 4,893,441 A | | 1/1990 | Catalano et al. |
| 5,459,230 A | | 10/1995 | de Jong et al. |
| 5,484,851 A | * | 1/1996 | Fock ....................... 525/333.5 |
| 5,489,667 A | | 2/1996 | Knipf et al. |
| 6,303,689 B1 | * | 10/2001 | Maillet et al. ................. 525/66 |
| 6,825,270 B1 | * | 11/2004 | Lacroix ....................... 525/66 |

FOREIGN PATENT DOCUMENTS

| | | |
|---|---|---|
| DE | 3 730 504 | 3/1989 |
| EP | 167 824 | 1/1986 |
| EP | 242 158 | 10/1987 |
| EP | 613 919 | 9/1994 |
| EP | 927 727 | 7/1999 |
| FR | 2 519 012 | 7/1983 |
| FR | 2 582 659 | 12/1986 |
| JP | 60 023 435 | 2/1985 |
| JP | 60 170 646 | 9/1985 |
| JP | 02-014232 | 1/1990 |
| JP | 3-237149 | 10/1991 |
| JP | 042 39045 | 8/1992 |
| JP | 0 437 0156 | 12/1992 |
| JP | 06 287 547 | 10/1994 |
| JP | 08 239 530 | 9/1996 |
| JP | 08 143 780 | 9/1997 |
| JP | 09 249780 | 9/1997 |
| JP | 09-302172 | 11/1997 |
| JP | 11 060 855 | 3/1999 |
| JP | 11 060 856 | 3/1999 |
| WO | 94/11412 | 5/1994 |
| WO | 96/24260 | 8/1996 |
| WO | 01/10951 A1 | 2/2001 |
| WO | WO 01/10951 | 2/2001 |
| WO | 01/29113 A1 | 4/2001 |

OTHER PUBLICATIONS

J. Polym. Sci., Part C: Polym. Lett. (1989), 27 (12), 481–488.
J. Polym. Sci., Part B: Polym. Phys. (1996), 34 (7), 1289–1299.
JAPS, (1995), 58 (4), 753–770.
R. Fayt, et al., "Molecular Design of Multicomponent Polymer Systems. Emulsification of Polystyrene and Nylon–6 by a Reactive Block Copolymer", J. Polym. Sci., Part C: Polym. Lett. (1989), 27 (12), 481.
Patric Jannasch, et al., "On the Macro– and Microphase Separation of Compatibilizers in Immiscible Polymer Blends", J. Polym. Sci., Part B: Polym. Phys. (1996), 34 (7), 1289.
Patrick Jannasch, et al., "Poly(styrene–graft–ethylene oxide) as a Compatibilizer in Polystyrene/Polyamide Bleds", JAPS, (1995), 58 (4), 753.

* cited by examiner

Primary Examiner—Ana Woodward
(74) Attorney, Agent, or Firm—Smith, Gambrell & Russell, LLP

(57) ABSTRACT

The invention relates to a composition comprising, for 100 parts by weight, 99–60 parts of a styrenic polymer (A), 1–40 parts of (B)+(C), (B) being a polyamide block and polyether block copolymer essentially comprising ethylene oxide patterns ($C_2H_4$-O)—, (C) being a compatibilizer of styrene and at least one polymerized block comprising ethylene patterns, (B)/(C) ranging from 2 to 10.

22 Claims, No Drawings

ANTISTATIC STRENIQUE POLYMER COMPOSITIONS

FIELD OF THE INVENTION

The present invention relates to antistatic styrenic polymer compositions and more specifically to a composition comprising a styrenic polymer (A), a copolymer (B) containing polyamide blocks and polyether blocks comprising essentially ethylene oxide units —(C$_2$H$_4$—O)—, and a compatibilizer (C).

BACKGROUND OF THE INVENTION

The aim of the invention is to give the styrenic polymer (A) antistatic properties. The formation and retention of static-electricity charges on the surface of most plastics are known. The presence of static electricity on thermoplastic films results, for example, in these films sticking to one another, making them difficult to separate. The presence of static electricity on packaging films may cause the accumulation of dust on the articles to be packaged and thus impede their use. Styrenic resins, such as polystyrene or ABS, are used to make cases for computers, for telephones, for televisions, for photocopiers, and for numerous other articles. Static electricity causes accumulation of dust but most importantly can also cause damage to microprocessors or constituents of electronic circuits present in these articles. For these applications, it is generally desirable to find compositions based on styrenic resin whose surface resistivity is below $5.10^{13}$ ?/? measured to the standard IEC93 or whose volume resistivity is below $5.10^{16}$ ?.cm measured to the standard IEC93 (the type of resistivity being chosen as a function of the application, given that these two types of resistivity always increase in the same direction). This is based on the consideration that these resistivities provide adequate antistatic properties for certain applications in the field of polymer materials in contact with electronic components.

DESCRIPTION OF INVENTION

The prior art has described antistatic agents, such as ionic surfactants of ethoxylated amine type or sulfonate type which are added within polymers. However, the antistatic properties of the polymers depend on ambient humidity and are not permanent, since these agents migrate to the surface of the polymers and disappear. Copolymers containing hydrophilic polyether blocks and polyamide blocks have therefore been proposed as antistatic agents, these agents having the advantage of not migrating and therefore of providing antistatic properties which are permanent and less dependent on ambient humidity.

The Japanese patent application JP 60 170 646 A, published Sep. 4, 1985, describes compositions consisting of from 0.01 to 50 parts of polyether block amide and 100 parts of polystyrene, these being used to make sliding parts and wear-resistant parts. The antistatic properties are not mentioned.

Patent application EP 167 824, published Jan. 15, 1986, describes compositions similar to the preceding compositions, and according to one embodiment of the invention the polystyrene may be blended with a polystyrene functionalized by an unsaturated carboxylic anhydride. These compositions are used to make injection-molded parts. The antistatic properties are not mentioned.

The Japanese patent application JP 60 023 435 A, published Feb. 6, 1985, describes antistatic compositions comprising from 5 to 80% of polyetheresteramides and from 95 to 20% of a thermoplastic resin chosen from, inter alia, polystyrene, ABS and PMMA, this resin being functionalized by acrylic acid or maleic anhydride. The amount of polyetheresteramide in the examples is 30% by weight of the compositions.

The patent EP 242 158 describes antistatic compositions comprising from 1 to 40% of polyetheresteramide and from 99 to 60% of a thermoplastic resin chosen from styrenic resins, PPO and polycarbonate. According to a preferred embodiment, the compositions also comprise a vinyl polymer functionalized by a carboxylic acid, one example being a polystyrene modified by methacrylic acid.

The international patent application PCT/FR00/02140 teaches the use of copolymers of styrene and of an unsaturated carboxylic anhydride, copolymers of ethylene and of an unsaturated carboxylic anhydride, copolymers of ethylene and of an unsaturated epoxide, block copolymers in the form of SBS or SIS grafted with a carboxylic acid or an unsaturated carboxylic anhydride, as compatibilizer between a styrenic resin and a copolymer containing polyamide blocks and polyether blocks.

Other prior-art documents which may be cited are:

EP 927727,
J. Polym. Sci., Part C: Polym. Lett. (1989), 27(12), 481
J. Polym. Sci., Part B, Polym. Phys. (1996), 34(7), 1289
JAPS, (1995), 58(4), 753
JP 04370156
JP 04239045
JP 02014232
JP 11060855
JP 11060856
JP 09249780
JP 08239530
JP 08143780

The prior art demonstrates either blends (i) of styrenic resin and polyetheresteramide without compatibilizer or blends (ii) of polyetheresteramide and functionalized styrenic resin or else blends (iii) of polyetheresteramide, non-functionalized styrenic resin and functionalized styrenic resin.

The blends (i) are antistatic if the polyetherester-amide is carefully chosen, but have poor mechanical properties, elongation at break in particular being much lower than that of the styrenic resin alone. As far as the blends (ii) and (iii) are concerned, it is necessary to have access to a functionalized styrenic resin, and this is a complicated and costly matter. The object of the invention is to provide antistatic properties to the ordinary styrenic resins used to make the abovementioned articles, these being non-functionalized resins. It has now been found that when particular compatibilizers are used it is possible to obtain styrenic resin compositions which comprise a styrenic resin and a copolymer containing polyamide blocks and polyether blocks, and which have excellent elongation at break, excellent tensile strength and excellent impact resistance (Charpy notched), when compared with the same composition without compatibilizer.

The present invention provides a composition comprising per 100 parts by weight:

from 99 to 60 parts by weight of a styrenic polymer (A),
from 1 to 40 parts by weight of (B)+(C), (B) being a copolymer containing polyamide blocks and polyether blocks comprising essentially ethylene oxide units —(C$_2$H$_4$—O)—, and (C) being a compatibilizer chosen from block copolymers comprising at least one polymerized block comprising styrene and at least one polymerized block comprising ethylene oxide units.

In the polymerized block comprising ethylene oxide units, the repeat unit is —O—CH$_2$—CH$_2$—. This block may also be called a PEG (i.e. polyethylene glycol) block.

Polyphenylene oxide (PPO) may be absent in the composition according to the invention.

By way of example of styrenic polymer (A) mention may be made of polystyrene, polystyrene modified by elastomers, random or block copolymers of styrene and of dienes such as butadiene, copolymers of styrene and of acrylonitrile (SAN), SAN modified by elastomers, in particular ABS, obtained, for example, by grafting (graft polymerization) of styrene and acrylonitrile on a graft-base composed of polybutadiene or of butadiene-acrylonitrile copolymer, and blends of SAN and of ABS. The abovementioned elastomers may be, for example, EPR (abbreviation for ethylene-propylene rubber or ethylene-propylene elastomer), EPDM (abbreviation for ethylene-propylene-diene rubber or ethylene-propylene-diene elastomer), polybutadiene, acrylonitrile-butadiene copolymer, polyisoprene, isoprene-acrylonitrile copolymer. In particular, A may be an impact polystyrene comprising a matrix of polystyrene surrounding rubber nodules generally comprising polybutadiene.

In the abovementioned polymers (A), part of the styrene may be replaced by unsaturated monomers copolymerizable with styrene, and by way of example mention may be made of alpha-methylstyrene and the (meth)acrylic esters. In this case, A may comprise a copolymer of styrene, among which mention may be made of styrene-alpha-methyl-styrene copolymers, styrene-chlorostyrene copolymers, styrene-propylene copolymers, styrene-butadiene copolymers, styrene-isoprene copolymers, styrene-vinyl chloride copolymers, styrene-vinyl acetate copolymers, styrene-alkyl acrylate copolymers (methyl acrylate, ethyl acrylate, butyl acrylate, octyl acrylate, phenyl acrylate), styrene-alkyl methacrylate copolymers (methyl methacrylate, ethyl methacrylate, butyl methacrylate, phenyl methacrylate), styrene-methyl chloroacrylate copolymers and styrene-acrylonitrile-alkyl acrylate copolymers. The content of comonomers in these polymers is generally up to 20% by weight. The present invention also provides high-melting-point metallocene polystyrenes.

Without exceeding the scope of the invention, (A) could be a blend of two or more of the preceding polymers.

The styrenic polymer A preferably comprises more than 50% by weight of styrene. If the styrenic polymer is SAN, it preferably contains more than 75% by weight of styrene.

The polymers (B) containing polyamide blocks and polyether blocks are the result of copolycondensation of terminally reactive polyamide sequences with terminally reactive polyether sequences, examples being, inter alia:
1) Polyamide sequences having diamine chain ends with polyoxyalkylene sequences having dicarboxylic chain ends.
2) Polyamide sequences having dicarboxylic chain ends with polyoxyalkylene sequences having diamine chain ends and obtained via cyanoethylation and hydrogenation of alpha-omega-dihydroxylated aliphatic polyoxyalkylene sequences known as polyetherdiols.
3) Polyamide sequences having dicarboxylic chain ends with polyetherdiols, the products obtained in this particular case being polyetheresteramides. The copolymers (B) are advantageously of this type.

The polyamide sequences having dicarboxylic chain ends derive, for example, from the condensation of alpha-omega-aminocarboxylic acids, of lactams or of dicarboxylic acids and diamines in the presence of a dicarboxylic acid as chain regulator.

The number-average molecular weight $\overline{Mn}$ of the polyamide sequences is between 300 and 15 000 and preferably between 600 and 5000. The weight $\overline{Mn}$ of the polyether sequences is between 100 and 6000 and preferably between 200 and 3000.

The polymers containing polyamide blocks and polyether blocks may also comprise units having random distribution. These polymers may be prepared via simultaneous reaction of the polyether and of the precursors of the polyamide blocks.

For example, a reaction may be carried out using polyetherdiol, a lactam (or an alpha-omega-amino acid) and a diacid chain regulator in the presence of a little water. This gives a polymer having essentially polyether blocks and polyamide blocks of very variable length, and also having the various reactants randomly distributed along the polymer chain, having reacted in random fashion.

These polymers containing polyamide blocks and polyether blocks which derive from the copolycondensation of polyamide sequences and polyethers prepared previously or from a one-step reaction have, for example, Shore D hardnesses which can be between 20 and 75 and advantageously between 30 and 70 and have intrinsic viscosity between 0.8 and 2.5 measured in meta-cresol at 250° C. for an initial concentration of 0.8 g/100 ml. The MFIs may be between 5 and 50 (235° C. under a load of 1 kg).

The polyetherdiol blocks are either used as they stand and copolycondensed with the carboxylic-terminated polyamide blocks or are aminated and then converted to polyetherdiamines and condensed with the carboxylic-terminated polyamide blocks. They may also be mixed with precursors of polyamide and a chain regulator to make polymers containing polyamide blocks and polyether blocks having randomly distributed units.

Polymers containing polyamide blocks and polyether blocks are described in the patents U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920.

In a first embodiment of the invention, the polyamide sequences having dicarboxylic chain ends derive, for example, from the condensation of alpha-omega-aminocarboxylic acids, of lactams or of dicarboxylic acids and diamines in the presence of a dicarboxylic acid chain regulator. By way of example of alpha-omega-aminocarboxylic acids, mention may be made of aminoundecanoic acid, and by way of example of a lactam mention may be made of caprolactam and laurolactam, and by way of example of dicarboxylic acid mention may be made of adipic acid, decanedioic acid and dodecanedioic acid, and by way of example of diamine mention may be made of hexamethylenediamine. The polyamide blocks are advantageously composed of nylon-12 or of nylon-6. The melting point of these polyamide sequences, which is also that of the copolymer (B), is generally from 10 to 15° C. below that of PA 12 or of PA 6.

Depending on the nature of (A), it can be useful to use a copolymer (B) whose melting point is less high in order to avoid degrading (A) during the incorporation of (B), and this is the subject of the second and third embodiment of the invention below.

In a second embodiment of the invention, the polyamide sequences are the result of condensation of one or more alpha-omega-aminocarboxylic acids and/or of one or more lactams having from 6 to 12 carbon atoms in the presence of a dicarboxylic acid having from 4 to 12 carbon atoms, and are of low weight, i.e. $\overline{Mn}$ from 400 to 1000. By way of example of alpha-omega-amino-carboxylic acid mention may be made of aminoundecanoic acid and aminododecanoic acid. By way of example of dicarboxylic acid mention may be made of adipic acid, sebacic acid, isophthalic acid, butanedioic acid, cyclohexane-1,4-dicarboxylic acid, terephthalic acid, the sodium or lithium salt of sulfoisophthalic acid, dimerized fatty acids (these dimerized fatty acids having a dimer content of at least 98% by weight and preferably being hydrogenated) and dodecanedioic acid HOOC—$(CH_2)_{10}$—COOH.

By way of example of lactam, mention may be made of caprolactam and laurolactam.

Caprolactam should be avoided unless the polyamide is purified by removing the caprolactam monomer which remains dissolved within it.

Polyamide sequences obtained via condensation of laurolactam in the presence of adipic acid or of dodecanedioic acid and having a weight $\overline{Mn}$ of 750 have a melting point of 127–130° C.

In a third embodiment of the invention, the polyamide sequences are the result of condensation of at least one alpha-omega-aminocarboxylic acid (or one lactam), at least one diamine and at least one dicarboxylic acid. The alpha-omega-aminocarboxylic acid, the lactam and the dicarboxylic acid may be chosen from those mentioned above.

The diamine may be an aliphatic diamine having from 6 to 12 atoms, or it may be an acrylic and/or saturated cyclic diamine.

By way of examples mention may be made of hexamethylenediamine, piperazine, 1-aminoethylpiperazine, bisaminopropylpiperazine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(amino-cyclohexyl)methane (BACM), bis(3-methyl-4-aminocyclohexyl)methane (BMACM).

In the second and third embodiment of the invention, the various constituents of the polyamide sequence and their proportion are chosen in order to obtain a melting point below 150° C. and advantageously between 90 and 135° C. Low-melting-point copolyamides are described in the patents U.S. Pat. No. 4,483,975, DE 3 730 504, U.S. Pat. No. 5,459,230. The same proportions of the constituents are utilized for the polyamide blocks of (B). (B) may also be the copolymers described in U.S. Pat. No. 5,489,667.

The polyether blocks may represent from 5 to 85% by weight of (B). The polyether blocks may contain units other than the ethylene oxide units, e.g. units of propylene oxide or of polytetrahydrofuran (which leads to polytetramethylene glycol sections within the chain). Simultaneous use may also be made of PEG blocks, i.e. blocks consisting of ethylene oxide units, PPG blocks, i.e. blocks consisting of propylene oxide units, and PTMG blocks, i.e. blocks consisting of tetramethylene glycol units, also termed polytetrahydrofuran. Use is advantageously made of PEG blocks or of blocks obtained by ethoxylation bisphenols, e.g. bisphenol A. These latter products are described in patent EP 613 919. The amount of polyether blocks in (B) is advantageously from 10 to 50% by weight of (B) and preferably from 35 to 50%.

The copolymers of the invention may be prepared by any means permitting linkage of the polyamide blocks to the polyether blocks. Essentially, two processes are used in practice, one being a two-step process and the other being a single-step process.

The two-step process consists firstly in preparing the carboxylic-terminated polyamide blocks via condensation of precursors of polyamide in the presence of a dicarboxylic acid chain regulator, and then, in a second step, in adding the polyether and a catalyst. If the precursors of polyamide are only lactams or alpha-omega-aminocarboxylic acids, a dicarboxylic acid is added. If the precursors themselves comprise a dicarboxylic acid it is used in excess with respect to the stoichiometry of the diamines. The reaction usually takes place between 180 and 300° C., preferably from 200 to 260° C., the pressure developing in the reactor being between 5 and 30 bar, and being maintained for about 2 hours. The pressure is slowly reduced to atmospheric pressure and then the excess water is distilled off, for example for one or two hours.

Once the carboxylic-terminated polyamide has been prepared, the polyether and a catalyst are then added. The polyether may be added in one or more portions, and the same applies to the catalyst. In one advantageous embodiment, the polyether is added first, and the reaction of the terminal OH groups of the polyether and of the terminal COOH groups of the polyamide begins with formation of ester bonds and elimination of water; water is removed as far as possible from the reaction mixture by distillation, and then the catalyst is introduced in order to obtain the bond between the amide blocks and the polyether blocks. This second step is carried out with stirring, preferably under a vacuum of at least 5 mm of Hg (650 Pa) at a temperature such that the reactants and the copolymers obtained are molten. By way of example, this temperature may be between 100 and 400° C. and mostly between 200 and 300° C. The reaction is followed by measuring the torque exerted by the molten polymer on the stirrer or by measuring the electrical power consumed by the stirrer. The end of the reaction is determined by the torque value or target power value. The catalyst is defined as being any material making it easier to bond the polyamide blocks to the polyether blocks via esterification. The catalyst is advantageously a derivative of a metal (M) chosen from the group formed by titanium, zirconium and hafnium.

By way of example of a derivative mention may be made of the tetraalkoxides complying with the general formula $M(OR)_4$, in which M represents titanium, zirconium or hafnium and R, identical or different, indicate linear or branched alkyl radicals having from 1 to 24 carbon atoms.

Examples of the $C_1$–$C_{24}$-alkyl radicals among which the radicals R are chosen for the tetraalkoxides used as catalysts in the process according to the invention are methyl, ethyl, propyl, isopropyl, butyl, ethylhexyl, decyl, dodecyl, hexadodecyl. The preferred catalysts are the tetraalkoxides for which the radicals R, identical or different, are the $C_1$–$C_8$-alkyl radicals. Particular examples of these catalysts are $Zr(OC_2H_5)_4$, $Zr(O-isoC_3H_7)_4$, $Zr(OC_4H_9)_4$, $Zr(OC_5H_{11})_4$, $Zr(OC_6H_{13})_4$, $Hf(OC_2H_5)_4$, $Hf(OC_4H_9)_4$, $Hf(O-isoC_3H_7)_4$.

The catalyst used in the process according to the invention may consist solely of one or more tetraalkoxides defined above of formula $M(OR)_4$. It may also be formed by combining one or more of these tetraalkoxides with one or more alcoholates of alkali metals or of alkaline earth metals having the formula $(R_1O)_pY$ in which $R_1$ indicates a hydrocarbon radical, advantageously a $C_1$–$C_{24}$-alkyl radical, and preferably a $C_1$–$C_8$-alkyl radical, Y represents an alkali metal or alkaline earth metal, and p is the valency of Y. The amounts of alcoholate of alkali metal or of alkaline earth metal and of tetraalkoxides of zirconium or of hafnium that are combined to constitute the mixed catalyst may vary within wide limits. However, it is preferable to use amounts of alcoholate and of tetraalkoxides such that the molar proportion of alcoholate is approximately equal to the molar proportion of tetraalkoxide.

The proportion by weight of catalyst, i.e. of the tetraalkoxide(s) if the catalyst does not include alcoholate of alkali metal or of alkaline earth metal, or else of the entirety of the tetraalkoxide(s) and of the alcoholate(s) of alkali metal or of alkaline earth metal if the catalyst is formed by combining these two types of compound, advantageously varies from 0.01 to 5% by weight of the mixture of the dicarboxylic polyamide with the polyoxyalkylene glycol, and is preferably between 0.05 and 2% of that weight.

By way of example of other derivatives, mention may also be made of the salts of the metal (M), in particular the salts of (M) with an organic acid and the complex salts of the oxide of (M) and/or the hydroxide of (M) with an organic acid. The organic acid may advantageously be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic and propionic acids are particularly preferred. M is advantageously zirconium. These salts may be termed zirconyl salts. Without being bound by this explanation, the Applicant thinks that these salts of zirconium with an organic acid or the complex salts mentioned above release $ZrO^{++}$ during the course of the process. Use is made of the product sold as zirconyl acetate. The amount to use is the same as that for the $M(OR)_4$ derivatives.

This process and these catalysts are described in the patents U.S. Pat. No. 4,332,920, U.S. Pat. No. 4,230,838, U.S. Pat. No. 4,331,786, U.S. Pat. No. 4,252,920, JP 07145368A, JP 06287547A and EP 613919.

With respect to the single-step process, all the reactants used in the two-step process are mixed, i.e. the precursors of polyamide, the dicarboxylic acid chain regulator, the polyether and the catalyst. The reactants and the catalyst are the same as those in the two-step process described above. If the precursors of polyamide are only lactams, it is advantageous to add a little water.

The copolymer essentially has the same polyether blocks and the same polyamide blocks, but also has a small fraction of the various reactants randomly distributed along the polymer chain, having reacted in random fashion.

The reactor is closed and heated, with stirring, as in the first step of the two-step process described above. The pressure that develops is between 5 and 30 bar. Once the pressure increase has concluded, reduced pressure is applied to the reactor while maintaining vigorous stirring of the molten reactants. The reaction is followed as above for the two-step process.

The catalyst used in this one-step process is preferably a salt of the metal (M) with an organic acid or a complex salt of the oxide of (M) and/or the hydroxide of (M) with an organic acid.

The ingredient (B) may also be a polyetheresteramide (B) having polyamide blocks comprising sulfonates of dicarboxylic acids either as chain regulators for the polyamide block or in association with a diamine as one of the monomers constituting the polyamide block, and having polyether blocks essentially consisting of alkylene oxide units, as described in the international application PCT/FR00/02889.

The compatibilizer C is a block copolymer comprising at least one polymerized block comprising styrene and at least one polymerized block comprising ethylene oxide units.

The polymerized block comprising styrene is generally present in C in a proportion of from 60 to 99% by weight and preferably from 60 to 98% by weight.

The polymerized block comprising ethylene oxide units is generally present in C in a proportion of from 40 to 1% by weight and preferably from 40 to 2% by weight.

The polymerized block comprising styrene generally has a glass transition temperature above 100° C. and preferably comprises at least 50% by weight of styrene. The polymerized block comprising styrene may also comprise an unsaturated epoxide (obtained by copolymerization), this latter preferably being glycidyl methacrylate. The unsaturated epoxide may be present in a proportion of from 0.01% to 5% by weight in the polymerized block comprising styrene.

The block copolymer comprising at least one polymerized block comprising styrene and at least one polymerized block comprising ethylene oxide units may also be grafted with an unsaturated epoxide, preferably glycidyl methacrylate.

By way of example of unsaturated epoxide, mention may be made of:
- the aliphatic glycidyl esters and aliphatic glycidyl ethers, such as allyl glycidyl ether, vinyl glycidyl ether, glycidyl maleate and glycidyl itaconate, and glycidyl (meth)acrylate, and
- the alicyclic glycidyl esters and alicyclic glycidyl ethers, such as 2-cyclohexene glycidyl ether, diglycidyl cylohexene-4,5-dicarboxylate, glycidyl cyclohexene-4-carboxylate, glycidyl 2-methyl-5-norbornene-2-carboxylate and diglycidyl cis-endo-bicyclo[2.2.1]-5-heptene-2,3-dicarboxylate.

In the block comprising styrene, part of the styrene may be replaced by unsaturated monomers copolymerizable with styrene, and by way of example mention may be made of alpha-methylstyrene and the (meth)acrylic esters. In this case, the block comprising styrene is a copolymer of styrene, among which mention may be made of styrene-alpha-methylstyrene copolymers, styrene-chlorostyrene copolymers, styrene-butadiene copolymers, styrene-isoprene copolymers, styrene-vinyl chloride copolymers, styrene-vinyl acetate copolymers, styrene-alkyl acrylate copolymers (methyl acrylate, ethyl acrylate, butyl acrylate, octyl acrylate, phenyl acrylate), styrene-alkyl methacrylate copolymers (methyl methacrylate, ethyl methacrylate, butyl methacrylate, phenyl methacrylate), styrene-methyl chloroacrylate copolymers and styrene-acrylonitrile-alkyl acrylate copolymers.

The polymerized block comprising ethylene oxide units preferably comprises no comonomer. This block generally terminates in the function —OH deriving from the ethylene glycol used as monomer for its preparation.

In particular, C may be:
- a diblock copolymer comprising a block of a polymer of styrene and a block of a polymer of ethylene glycol (polyethylene glycol);
- a diblock copolymer comprising a homopolystyrene block and a block of a polymer of ethylene glycol (polyethylene glycol);

Within the scope of the invention is it possible to use one or more compatibilizers C.

The compatibilizer C may in particular be prepared by controlled free-radical polymerization methods in the presence of a stable free radical (generally a nitroxide) following the principle of the teaching of WO 9411412 or WO 96/24260 or EP 927727.

The level of antistatic properties increases with the proportion of (B) and, for equal amounts of (B), with the proportion of ethylene oxide units present in (B).

According to the application, preference will be given to including a proportion of (B) sufficient to obtain, in the final composition, a surface resistivity below $5.10^{13}$ ?/? measured to the standard IEC93. According to the application, preference will be given to including a proportion of (B) sufficient to give the final composition a volume resistivity below $5.10^{16}$ ?.cm measured to the standard IEC93.

The amount of (B)+(C) is advantageously from 5 to 30 parts per 95–70 parts of (A) and preferably from 10 to 20 per 90–80 parts of (A). The (B)/(C) ratio is advantageously between 4 and 10. The amount of C in the composition may be from 0.5 to 5 parts by weight per 100 parts by weight of composition.

Within the scope of the invention it is possible to add mineral fillers (talc, $CaCO_3$, kaolin, etc.), reinforcing agents (glass fiber, mineral fiber, carbon fiber, etc.), stabilizers (heat, UV), flame retardants and colorants.

The compositions of the invention are prepared by the methods usual for thermoplastics, e.g. by extrusion or with the aid of twin-screw mixers.

The present invention also provides the articles manufactured with the preceding compositions; examples of these are films, pipes, sheets, packaging, cases for computers, for fax machines or for telephones.

A method of preparing a PS-b-PEG block copolymer is given below.

Materials Used:

HO-TEMPO (or TEMPO-OH): 4-hydroxy-2,2,6,6-tetramethyl-1-piperidinyloxy usually marketed as 4-hydroxy TEMPO;

Azocarboxy: 4,4'-azobis(cyanovaleric acid):

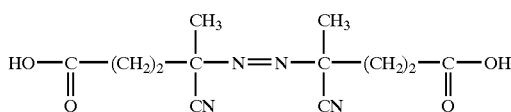

(this product is marketed by ATOFINA with the name "azocarboxy")

POE: poly(ethylene glycol)methyl ether:
$CH_3-(O-CH_2-CH_2)_{45}-OH$

DCC: dicylcohexylcarbodiimide:

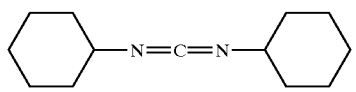

DMAP: dimethylaminopyridine:

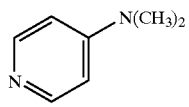

The synthesis is conducted in two steps:
1. Synthesis of the AZO-PEG macroinitiator, then
2. (Controlled) free-radical polymerization of styrene 1. Synthesis of the AZO-PEG Macroinitiator The table below brings together the ingredients and the quantities used for this synthesis:

| | | |
|---|---|---|
| AZO | g | 2.832 |
| | mol | 0.0101 |
| POE-OH | g | 44.75 |
| | mol | 0.0224 |
| DCC | g | 4.13 |
| | mol | 0.0200 |
| DMAP | g | 0.145 |
| | mol | 0.0012 |
| $CH_2Cl_2$ | g | 141.5 |
| | mol | 1.656 |
| THF | g | 86.5 |
| | mol | 1.196 |

The solid compounds (POE-OH, azocarboxy and DMAP) are weighed, mixed and introduced into a 1 l glass reactor. The solvents are then added (first dichloromethane to dissolve the POE-OH then the THF to dissolve the azocarboxy) and cooled to a temperature of 0° C. The DCC is introduced with the aid of a syringe and a needle (being in solution in the dichloromethane) through a septum. The reaction is carried out at 0° C. for one hour, and the mixture is allowed to stand at ambient temperature for 20 hours (with mechanical stirring). The product is then Buchner-filtered: the filtrate is collected and the solvents (THF and $CH_2Cl_2$) are evaporated (rotary evaporator at ambient temperature). The residue is then dissolved in $CH_2Cl_2$, and Buchner filtered. The filtrate is evaporated again (rotary evaporator at ambient temperature) and the product is dried in a drying cabinet at ambient temperature for 12 h (yield 74%).

Analysis by C13 NMR:

| Yield by weight (%) | Free POE-OH (%) | POE-AZO-POE (%) | POE-AZO (%) | Mn (POE) (g/mol) | Time |
|---|---|---|---|---|---|
| 74 | 16.2 | 83.8 | 0 | 1823 | ≧20 h |

These results are determined by C13 NMR analysis. The initiator comprises 83.3% of 4,4'-azobis(polyethylene glycol cyanovalerate) and 16.2% of unreacted PEG-OH.

2. Controlled Free-Radical Polymerization

| | | TEMPO-OH | |
|---|---|---|---|
| STYRENE (g) | Weight (g) | Concentration (mol/l) | INITIATOR (g) |
| 802 | 1.381 | 0.00908 | 16.98 |

The TEMPO-OH is dissolved in the styrene and then introduced into a flask containing the initiator from step 1. The flask is degassed by bubbling nitrogen for about 20 min. The flask is then placed in an oil bath preheated to about 140° C. The polymerization is conducted for 720 min and samples for following the kinetics are regularly taken. The time zero corresponds to achievement of a temperature of 100° C. of the reaction mixture. At the end of the synthesis, the product is precipitated in methanol, filtered and dried in vacuo at 50° C. for 12 h.

Results:

The analyses were conducted in THF at ambient temperature.

| Time (min) | Mw (g/mol) | Mn (g/mol) | Ip | Conversion (%) |
|---|---|---|---|---|
| 186 | 29 700 | 24 400 | 1.2 | 22.07 |
| 387 | 41 500 | 33 100 | 1.3 | 37.62 |
| 480 | 47 000 | 36 450 | 1.3 | 46.54 |
| 720 (final) | 64 700 | 50 600 | 1.3 | 87.14 |

The samples were analyzed at 50° C. in deuterated chloroform, using $^1$H NMR: we determine the PS/PEG ratio by weight and the content by weight of monomeric styrene, based on the polymer, by integrating the unresolved complex peak for the PS aromatic protons (deducting the contribution from the monomeric styrene), integrating the narrow peaks of the CH2= group of the monomeric styrene and integrating the narrow peak of the ether groups of the PEG.

To gain an idea of the composition by weight, we used the Mn values determined by GPC and deduced a PS/PEG ratio by weight assuming the Mn of the PEG to be 2000 g/mol. The GPC results and the NMR results are in good agreement.

| % by weight | PS-b-PEG |
|---|---|
| Ratio PS/PEG NMR | 97%/3% |
| Ratio PS/PEG GPC | 96%/4% |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

What is claimed is:

1. A composition comprising, per 100 parts by weight:
   from 99 to 60 parts by weight of a styrenic polymer (A),
   from 1 to 40 parts by weight of(B)+(C),
   (B) being a copolymer containing polyamide blocks and polyether blocks comprising ethylene oxide units —(C$_2$H$_4$—O)—, and (C) being a compatibilizer selected from block copolymers comprising at least one polymerized block comprising styrene and at least one polymerized block comprising ethylene oxide units, the (B)/(C) ratio by weight being between 2 and 10.

2. The composition as claimed in claim 1 wherein the proportion of (B) is sufficient to give the final composition a surface resistivity below $5.10^{13}$ Ω/□ measured to the standard IEC93.

3. The composition as claimed in claim 1 wherein the proportion of (B) is sufficient to give the final composition a volume resistivity below $5.10^{16}$ Ω·cm measured to the standard IEC93.

4. The composition as claimed in claim 1, wherein the (B)/(C) ratio is between 4 and 10.

5. The composition as claimed in claim 1, wherein (A) comprises more than 50% of styrene.

6. The composition as claimed in claim 1, wherein the amount of(C) is from 0.5 to 5 parts by weight in 100 parts by weight of said composition.

7. The composition as claimed in claim 1, wherein the polymerized block comprising styrene is present in C in a proportion of from 60 to 99% by weight and wherein the polymerized block comprising ethylene oxide units is present in C in a proportion of from 40 to 1% by weight.

8. The composition as claimed in claim 1, wherein the polymerized block comprising styrene is present in C in a proportion of from 60 to 98% by weight and wherein the polymerized block comprising ethylene oxide units is present in C in a proportion of from 40 to 2% by weight.

9. The composition as claimed in claim 1, wherein the polymerized block comprising styrene comprises at least 50% by weight of styrene.

10. The composition as claimed in claim 1, wherein the polymerized block comprising ethylene oxide units comprises no comonomer.

11. The composition as claimed in claim 1, wherein (A) is a styrene-butadiene copolymer.

12. The composition as claimed in claim 1, wherein the amount of(B)+(C) is from 5 to 30 parts per 95–70 parts of(A).

13. The composition as claimed in claim 12, wherein the amount of(B)+(C) is from 10 to 20 per 90–80 parts of(A).

14. The composition as claimed in claim 1, wherein it comprises no polyphenylene oxide.

15. An article manufactured from a composition as claimed in claim 1.

16. A method for manufacturing electronic components comprising utilizing the composition of claim 1.

17. A composition comprising, per 100 parts by weight:
   from 99 to 60 parts by weight of a styrenic polymer (A),
   from 1 to 40 parts by weight of (B)+(C),
   (B) being a copolymer containing polyamide blocks and polyether blocks comprising ethylene oxide units —(C$_2$H$_4$—O)—, and (C) being a compatibilizer selected from block copolymers comprising at least one polymerized block comprising styrene and glycidyl methacrylate and at least one polymerized block comprising ethylene oxide units, the (B)/(C) ratio by weight being between 2 and 10.

18. An article manufactured from a composition as claimed in claim 17.

19. A method for manufacturing electronic components comprising utilizing the composition of claim 17.

20. A composition comprising, per 100 parts by weight:
   from 99 to 60 parts by weight of a styrenic polymer (A),
   from 1 to 40 parts by weight of (B)+(C),
   (B) being a copolymer containing polyamide blocks and polyether blocks comprising ethylene oxide units —(C$_2$H$_4$—O)—, and (C) being a compatibilizer selected from block copolymers comprising at least one polymerized block comprising styrene and at least one polymerized block comprising ethylene oxide units grafted with glycidyl methacrylate, the (B)/(C) ratio by weight being between 2 and 10.

21. An article manufactured from a composition as claimed in claim 20.

22. A method for manufacturing electronic components comprising utilizing the composition of claim 20.

* * * * *